United States Patent [19]
Sorensen et al.

[11] 3,961,464
[45] June 8, 1976

[54] CUTTERBAR CONTROL SYSTEM
[75] Inventors: Robert Sorensen, Glen Ellyn; Richard A. Zablocki, Downers Grove, both of Ill.
[73] Assignee: International Harvester Company, Chicago, Ill.
[22] Filed: Apr. 10, 1975
[21] Appl. No.: 566,877

[52] U.S. Cl. .................................. 56/10.4; 56/15.8
[51] Int. Cl.² .......................................... A01D 35/16
[58] Field of Search .............. 56/10.4, 15.5, 15.7, 56/15.8, 16.2, 264, DIG. 9

[56] References Cited
UNITED STATES PATENTS
2,550,412   4/1951   Girardi ............................ 56/16.2 X
3,418,796   12/1968   Hurlburt et al. ................. 56/15.8 X

*Primary Examiner*—J. N. Eskovitz
*Attorney, Agent, or Firm*—Dennis K. Sullivan; Floyd B. Harman

[57] ABSTRACT

A cutterbar control system for an agricultural or highway mower having a longitudinally rotatable pull bar connecting the tractor hitch frame and the drag bar. The cutterbar gag link is connected to the pull bar at a point removed from its axis of rotation and a float spring and lifting chain are mounted to the pull bar to rotate it against the load imposed by the cutterbar gag link. The pull bar is extendible in response to overloads imposed on the cutterbar.

17 Claims, 6 Drawing Figures

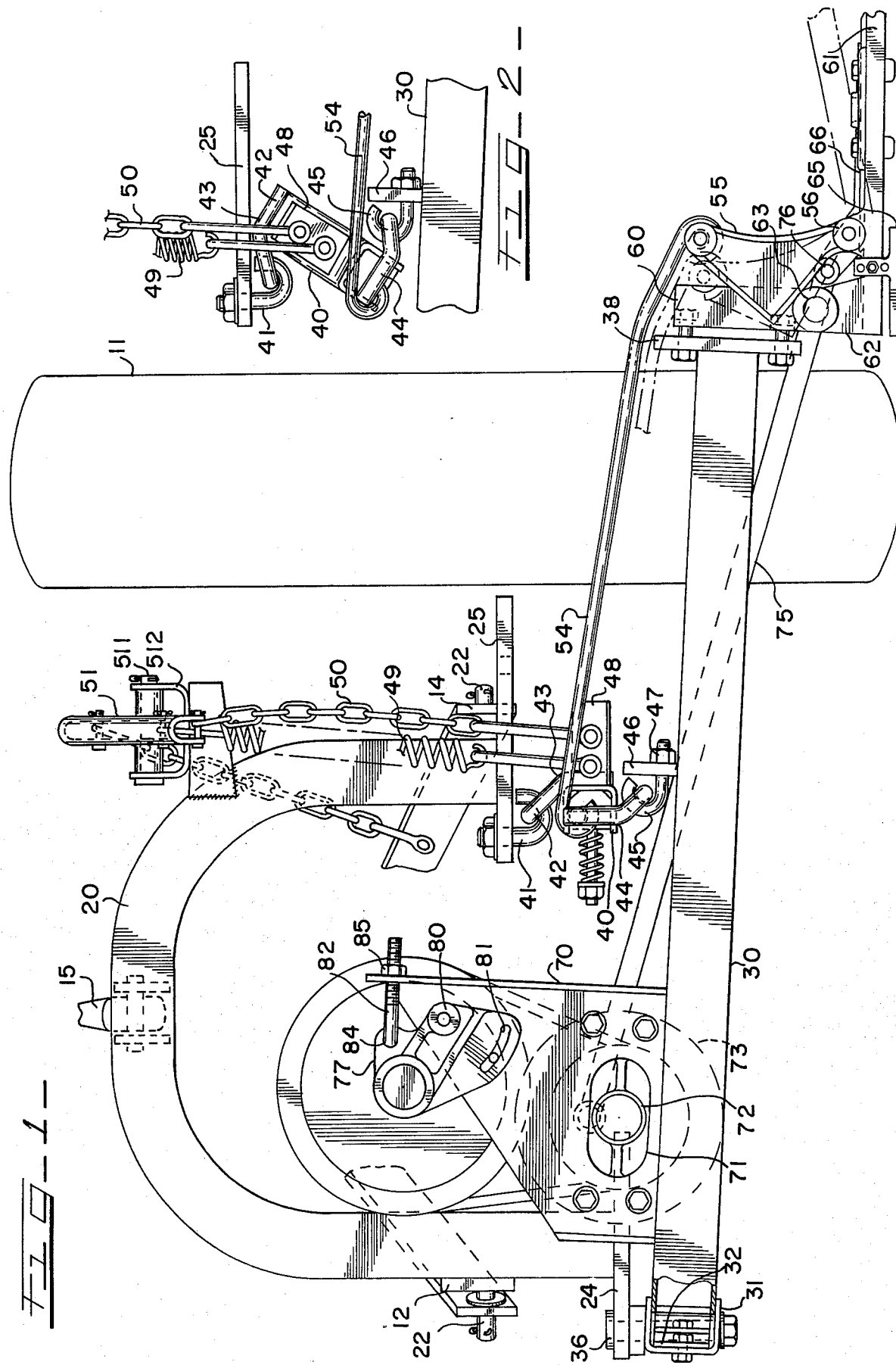

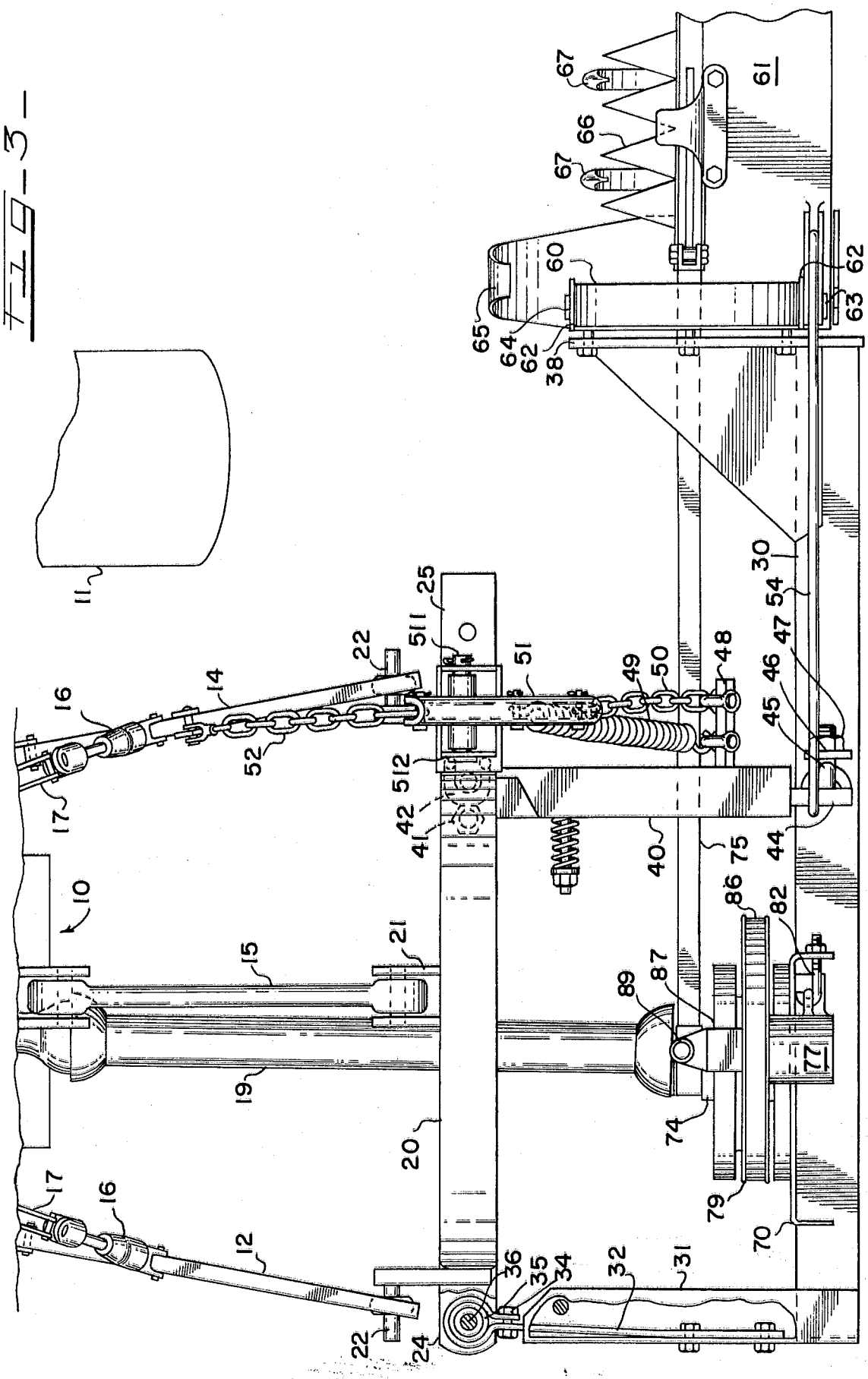

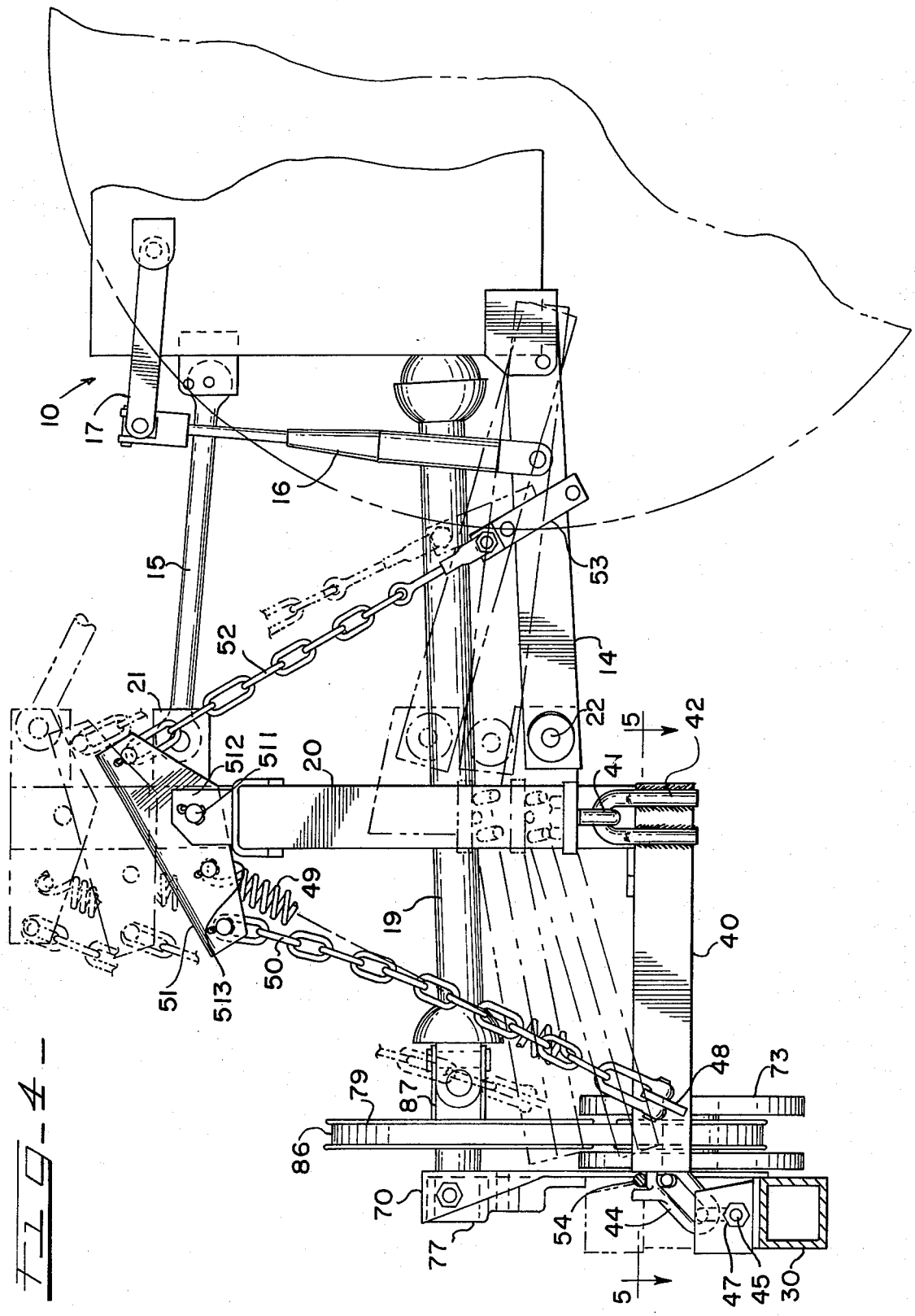

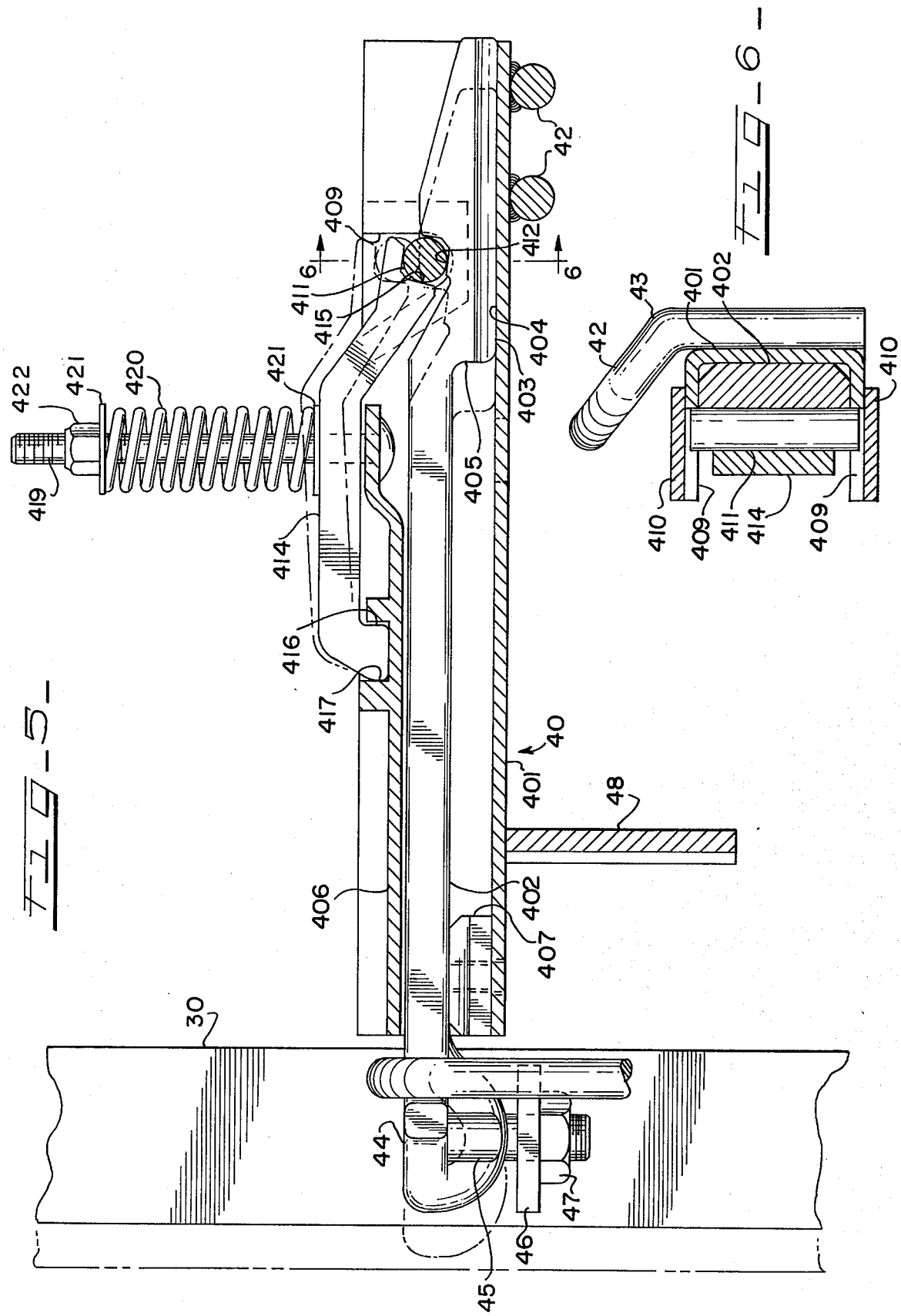

CUTTERBAR CONTROL SYSTEM

CROSS REFERENCES TO RELATED APPLICATIONS

This application is related to application Ser. No. 566,879, filed Apr. 10, 1975 entitled "Sickle Bar Mower Mounting Apparatus" by Robert Sorensen and Paul C. Gordon and to application Ser. No. 566,878, filed Apr. 10, 1975 entitled "Pitman Mower" by Robert Sorensen, Paul C. Gordon, and Richard A. Zablocki, both of the above applications being filed concurrently herewith and assigned to the assignee hereof.

BACKGROUND OF THE INVENTION

This invention relates to cutterbar mowers of the highway and agricultural type and, more particularly, to a novel cutterbar control system therefor wherein a single structure performs the combined functions of draft means, lift means, and may further perform the function of breakaway means.

THE PRIOR ART

Most mowers in commercial use comprise a drag bar connected at one end to a hitch frame which in turn is connected to the tractor, a pull bar which connects the intermediate portion of the drag bar to the hitch frame to provide a draft means, a lifting linkage which rotates the cutterbar about the end of the drag bar to a "gag" position, wherein the inner end of the cutterbar is on the ground and the outer end is off the ground and then raises the entire drag bar and cutterbar off the ground, the linkage usually including a float spring to counterbalance a portion of the weight of the cutterbar, and a breakaway mechanism to allow the cutterbar and the drag bar, in most cases, to rotate rearwardly when the cutterbar strikes an obstruction. Examples of these various functional elements may be found in the Hurlburt et al. U.S. Pat. No. 3,418,796, which primarily illustrates lifting linkage which does not function as draft means and U.S. Pat. No. 3,407,578, which shows the breakaway mechanism and the draft link which are used in the U.S. Pat. No. 3,418,796, and in the Burton U.S. Pat. No. 2,699,635 illustrating an extendible breakaway link but no lifting means. The problem with utilizing these prior art structures is that providing separate structures to fulfill these various functions adds to the complexity and weight of these mowers.

SUMMARY OF THE INVENTION

Accordingly, it is a general object of the invention described herein to provide a cutterbar control system for a mower wherein a single structure is utilized to provide the draft, lifting, and breakaway functions.

In accordance with the invention, the mower is provided with a hitch frame for attachment to a vertically movable tractor hitch, the mower drag bar being mounted for pivotal movement to one side of the hitch frame, usually the left side. A pull bar, preferably extendible in response to overload forces on the cutterbar, interconnects the opposite side of the hitch frame with the intermediate portion of the drag bar, the pull bar being mounted for rotation about an axis generally longitudinal thereof. The mounting of the pull bar to the hitch frame preferably is universal to permit lateral and vertical swinging movement of the pull bar, the mounting of the pull bar to the drag bar being similar. The cutterbar gag link, which pivots the cutterbar vertically about the end of the drag bar, is connected to the pull bar remote from the rotational axis thereof. The float spring and lifting chain are also connected respectively to the pull bar and are disposed to rotate the pull bar against the load imposed by the gag link.

BRIEF DESCRIPTION OF THE DRAWINGS

Thus, in accordance with our invention, a very simple arrangement for controlling the positioning of a mower cutterbar is provided which results in a light weight and relatively inexpensive structure, as will be apparent to those skilled in the art upon examination of the drawings, in which:

FIG. 1 is a rear view of a portion of a tractor and a mower incorporating the novel aspects of our invention, the mower being illustrated in the operating position;

FIG. 2 is a partial rear view of the mower of FIG. 1 illustrating the pull bar in the gag position;

FIG. 3 is a top view of the tractor and mower of FIG. 1 in the operating position;

FIG. 4 is a side view, partly in section, of the tractor and mower of FIG. 1 illustrating the mower in the operating position, the gag and lift position being illustrated in phantom;

FIG. 5 is a transverse longitudinal sectional view of the pull bar assembly taken along the line 5—5 of FIG. 4; and FIG. 6 is a sectional view of the pull bar assembly taken along the line 6—6 of FIG. 5.

DESCRIPTION OF THE PREFERRED EMBODIMENT

In accordance with the conventions of the industry, directional terms, such as "left", "right", "fore", and "aft", are to be considered as viewed by one standing behind the tractor and implement and facing them.

Turning to the drawings, there is shown the rear portion of a conventional agricultural tractor generally designated 10, including a right ground wheel 11, which is provided with a vertically movable, three point, free link hitch linkage in accordance with the art including a pair of left and right lower hitch links 12 and 14 respectively and an upper center link 15 pivotally mounted at their forward ends to the tractor 10 for vertical swinging movement. A pair of lift links 16 are pivotally mounted respectively to the lower hitch links 12 and 14 intermediate their ends and extend upwardly to pivotal connections to the powered tractor lift arms 17 which rotate in a vertical plane to raise and lower the hitch links. The tractor is provided with a standard power take-off means to which may be connected an extendible PTO shaft 19 for driving associated implements such as our mower.

The mower comprises an inverted U-shaped hitch frame or bail 20 of rectangular cross section having a generally upright transverse orientation. Integrally mounted to the forward side of the top center portion of the bail 20 is a clevis 21 to which is pinned the rearward end of the upper hitch link 15. Each of the legs of the bail 20 are provided respectively with an outwardly extending pin 22 which receives one of the lower hitch links 12 and 14, the pins 22 being arranged along a common axis. The hitch links thus maintain the bail 20 in an upright position while enabling it to be moved vertically. The left leg of the bail 20 extends downwardly from the pin 22 to a horizontal mounting plate 24 and the right leg extends downwardly to a horizontal mounting plate 25, which is at a higher level to accommodate the geometry of the lifting linkage as may be seen in FIG. 1.

The mower further comprises coupling means including a drag bar 30 and cutterbar 61 which, in the normal operating position, extend transversely, or parallel to the bail 20, in a generally horizontal plane. The left end of the drag bar 30 is provided with a U-shaped channel member 31 welded thereto and having an open right side, the member 31 extending forwardly towards the bail 20 but not touching it. As is discussed in detail in the referenced copending application Ser. No. 566,879, which is incorporated by reference herein, a fore-and-aft extending steel leaf spring 32 to inhibit vibration transfer to the tractor is attached at its rearward end to the channel member 31 as by bolts and is bent away therefrom to permit relative movement. The forward end of the leaf spring 32 is wrapped around and tightly clamped as by bolt assembly 34, to a bushing 35 which is mounted for free rotation on a vertical pin 36 to provide a vertical pivot axis for the entire drag bar assembly 30, the pin 36 depending downwardly from the left mounting plate 24, a nut and washer retaining the bushing 35 on the pin 36. The leaf spring 32 has its major cross sectional dimension in the vertical direction, thereby providing its major resiliency in the transverse direction. To permit a small amount of pivoting of the drag bar 30 relative to the bail during the lifting operation, the leaf spring also is capable of torsional deflection on the order of about 5° either way.

A generally fore-and-aft extending pull bar assembly 40, interconnects the right leg of the bail 20 with the intermediate portion of the drag bar 30, thereby forming a draft link. The connection between the forward end of the pull bar assembly 40 and the bail 20 is accomplished with a threaded hook 41 depending downwardly from the right horizontal plate 24, a nut drawing the free end of the hook 41 up into close proximity to the plate 24 transverse of the threaded shank thereof. The hook engages a U-shaped eye member 42 welded to the side of the forward portion of the pull bar assembly 40 and extending diagonally above the center thereof in the operating position, thereby forming a knee 43 at the corner of the pull bar assembly, the axis of the U-shaped eye being in the transverse plane. As thus constructed, the hook 41 permits universal pivoting movement of the pull bar assembly 40 about a pivot connection radially offset therefrom. The rearward end of the pull bar assembly 40 is provided with an oval shaped eye member 44 having a transverse opening which extends radially downwardly and rightwardly from the pull bar assembly 40 to produce an offset pivot connection with a threaded hook 45 which is mounted to and drawn up against, as by nut 47, an upstanding plate 46 affixed to the drag bar 30, the opening of the hook 45 being fore-and-aft. As thus constructed, the hook 45 permits universal pivoting movement of the pull bar assembly 40 thereabout.

Examining the pull bar assembly 40 in greater detail, as best seen in FIGS. 5 and 6, it can be seen that it comprises an outer tube 401 of U-shaped channel section, the eye member 42 being welded at the forward end thereof to the web portion of the U. A breakaway bar 402 having the oval eye member 44 as an integral part thereof slidably fits within the outer tube 401 for longitudinal movement therein, the breakaway bar 402 being of generally rectangular section of a size wherein its major dimension is slightly smaller than the distance between the legs of the channeled outer tube 401. The forward end of the breakaway bar 402 has a thicker section including a surface 403 which slides against the inner side 404 of the web portion of the channeled tube 401. Rearwardly of the surface 403, the breakaway bar 401 steps down to a smaller width forming a ledge 405, the width of the breakaway bar then being constant to its rear end. The outer tube 401 is provided with a guide plate 406 enclosing the fourth side for a distance at the rear end thereof. A stop block 407 is mounted to the web of the tube 401 opposite the guide plate 406 to prevent the breakaway bar from being pulled completely out of the outer tube 401 by the contact of the ledge 405 and the block 407.

Near its forward end, both legs of the channeled outer tube 401 are provided with a V-shaped cutout 409, a plate 410 being welded to the outer tube 401 to cover each of the cutouts 409. A detent pin 411 extends between the plates 410 and is of a length greater than the distance between the legs of the outer tube so that it may be guided in the cutouts 409. The forward end of the breakaway bar 402 is tapered to be small enough to clear the pin 411 at the bottom of the cutouts 409. Behind the tapered portion of the breakaway bar 402 and in register with the cutouts 409, a detent pocket 412 having a depth somewhat greater than the radius of the pin 411 is provided to receive the pin. A detent lever 414 is provided with a similar detent pocket 415 which fits on the other side of the pin 411 from the pocket 412. It can be seen from FIG. 5, that the detent pockets 412 and 415 form portions of the sides of a square, the square being rotated about 10 degrees clockwise from parallel with the edges of the outer tube 401. This rotation or angling of the detent pockets permits the pin 411 to roll out of the pocket 412 when the breakaway bar 402 is pulled rearwardly.

The detent lever 414 diagonals outwardly to the outside of the guide plate 406 and extends rearwardly to an end having an inturned lug 416 which fits within a pocket 417 formed on the outer side of the guide plate 406. Intermediate its ends, the detent lever 414 is provided with a hole through which a spring support pin 419 extends from the guide plate 406 to a threaded end. A compression spring 420 having retaining washers 421 at either end is mounted about the support pin 419, an adjusting nut 422 being screwed down on the pin to compress the spring 420, thereby setting the preload against the detent pin 411.

Thus, as shown in phantom in FIG. 5, when a sufficient force is applied to the end 44 of the breakaway bar 402, the pin 411 is forced upwardly by the angled detent pocket 412 in the breakaway bar against the detent lever 414 which is loaded by the spring 420 and rolls out of the detent pocket 412. The pull bar assembly 40 may then extend until the ledge 405 on the breakaway bar 402 contacts the stop block 407 on the outer tube 401.

The drag bar 30 extends rightwardly from the pull bar assembly 40 to a vertical cutterbar mounting plate 38 outboard of the tractor wheel 11. A hinge member 60 is bolted to the mounting plate 38 and extends downwardly to a bifurcated end whereat a transversely extending mower cutterbar 61 having hinge ears 62 is pivotally mounted thereto by pins 63 and 64 having a common fore and aft axis to provide for vertical swinging of the cutterbar 61 thereabout. The cutterbar 61 is of conventional design and is provided with an inner gaging shoe 65 and an outer gaging shoe (not shown).

Mounted on the forward side of the cutterbar are a conventional transversely reciprocating sickle 66 and mower guards 67.

As may be seen in FIGS. 1 and 2, the pull bar assembly 40 may rotate about an axis generally longitudinal thereof but slightly skewed therefrom which extends between the hooks 41 and 45. This action enable the pull bar assembly 40 to become part of the lifting linkage for the mower. To this end, the pull bar assembly 40 is provided with a radial lever arm 48 welded to the outer tube 401 near the rear end thereof. A float spring 49 and a lift chain 50 are connected to the lever arm 48 by pin and clevis assemblies, the spring being closer to the axis of the pull bar 40 than the lift chain. As may best be seen in FIG. 4, the opposite ends of the float spring 49 and lift chain 50 are connected to the rear end of a rocker lever 51 pivotally mounted on a transverse pin 511 mounted in a bracket 512 welded to the upper portion of the bail 20 vertically above the pull bar assembly 40, the lift chain 50 being connected to the rocker lever 51 further from the fulcrum pin 511 than the float spring 49 to provide it with additional mechanical advantage. The lower edge 513 of the lever 51 is positioned to the bottom of the bracket 512 to provide a stop against the downward travel of the lever 51 caused by the float spring 49 and lift chain 50. The forward end of the lever 51 is connected by a chain 52 to the intermediate portion 53 of the lower hitch link 14, the chain 52 being just taut at the position of the hitch links where gagging is to begin. The chain 52 could be attached to a fixed point on the tractor, such as the draw bar, if a greater amount of lifting is desired.

A gag link 54 comprising an elongated rod with hooked ends is pivotally connected to the upper portion of the oval eye member 44 away from the hook 45, that is, away from the axis of rotation of the pull bar assembly 40, and extends transversely whereat it is pivotally connected to the upper end of a lift lever 55 pivotally mounted to the cutterbar 61 as at 56, a medial portion of the lift lever resting on the hinge ear 62 of the cutterbar 61 to provide a fulcrum point therefor. Thus, as shown in phantom in FIG. 1, a leftward pull on the gag link 54 will cause the cutterbar 61 to pivot about the pins 63 and 64 raising the outer end of the cutterbar.

The mower drive means comprises an upstanding transverse plate 70 mounted on the drag bar 30 between the leaf spring 32 and the pull bar assembly 40. A bearing housing 71 is bolted to the lower part of the forward side of the plate 70 and extends therethrough. A shaft 72 is journalled in the housing 61 and extends forwardly whereat a flywheel 73 having a sheave is mounted thereon. The forward side of the flywheel 73 is provided with means 74 such as a pin and bearing housing for pivotally attaching a pitman stick 75 thereto, the flywheel being counterweighted against the weight of the mounting means 74 and about half of the weight of the pitman stick 75 in accordance with the art. The pitman stick 75 extends transversely downwardly to a pivotal connection with the sickle 66 as at 76. A journal arm 77, on which is journalled an input drive sheave 79, is pivotally mounted to the upper portion of the plate 70 about pin 80. The journal arm 77 is provided with an arcuate slot 81 concentric about the pin 80 through which a bolt may be inserted into the plate 70 to maintain the journal arm 77 in position. A J-bolt 82 hooks into the journal arm as at 84 and extends through an outturned edge of the plate 70 whereat it is provided with a nut 85 which may be used to tension a belt 86 extending around the drive sheave 79 and the sheave on the flywheel 73. A stub shaft 87 extends forwardly from the drive sheave to a universal joint assembly 89 providing a power connection with the PTO shaft 19.

THE OPERATION OF THE PREFERRED EMBODIMENT

In the normal operating position, as shown in solid lines in FIGS. 1, 3, and 4, the lower surface 513 of the rocker lever 51 is in contact with the mounting bracket 512 (FIG. 4). In this position, the lift chain 50 is slack to allow the mower to follow ground variations. The rocker arm actuating chain 52 is also untensioned. The float spring 49 is under tension and acts on the lever arm 48 to cause a torque on the pull bar assembly in a counterclockwise direction, as viewed in FIG. 1, thereby counterbalancing a portion of the weight of the outer end of the cutterbar 61 which acts through the gag link 54 to cause a torque on the pull bar assembly 40 in the clockwise direction. The float spring also counterbalances a portion of the weight of the inner end of the cutterbar by the vertical lifting force exerted on the drag bar through the hook connection at the rear end of the pull bar. Thus, the weight of the drag bar, the drive means, and the cutterbar will be counterbalanced to ride more lightly over the ground, thereby reducing ground friction as is desirable in mowing applications.

When the three point hitch linkage of the tractor is raised to move the mower to the gagged position, the distance between the intermediate point 53 on the lower hitch link 14 and the top of the bail 20 increases. This causes the chain 52 to be put into tension and pulls the forward end of the rocker lever 51 down in turn tensioning the chain 50 and causing the lever arm 48 and the pull bar assembly 40 to be rotated counterclockwise about the axis between the hooks 41 and 45 as viewed from the rear. Since the lift chain 50 is connected to the rocker lever 51 further away from the pin 511 than the float spring 49, the tension on the spring becomes lessened. Continued raising of the hitch rotates the pull bar assembly until the knee 43 of the U-shaped member 42 rotates up to contact the bottom side of the horizontal plate 25. This rotation also causes the oval eye member 44 to rotate clockwise about the hook 45 exerting a leftward pull on the gag link 54 which raises the outer shoe of the cutterbar off the ground. In FIG. 2, the pull bar is shown in the gagged position and it will be noted that, due to the radial offset of the eyes 42 and 44, the pull bar 40 has skewed from the axis of rotation. In viewing FIG. 4, it can be seen that the pull bar also rotates relative to the hooks 41 and 45 in the vertical fore-and-aft plane to allow the inner shoe 65 of the cutterbar to remain on the ground. When the knee 43 of the U-shaped eye 42 contacts the horizontal plate 25 on the bail 20, further rotation of the pull bar assembly is stopped with the mower in the gagged position. At this point, continued lifting of the three point hitch links will raise the inner shoe 65 off the ground and the entire cutterbar 61 and drag bar 30 to the uppermost phantom position shown in FIG. 4 for transport purposes. Since the rear end of the lever 51 continues to move upwardly relative to the bail 20, the lifting chain 50 pulls the pull bar assembly 40 into a more nearly horizontal position.

It is noted that when the hitch bail 20 is raised to rotate the pull bar assembly 40 to the gagged position, the left side of the hitch bail 20 raises the left end of the drag bar 30 to a greater angle relative to the ground, the inner shoe 65 remaining thereon. This is compensated in the left end of the drag bar by permitting torsional deflection of the spring 32 of about 5°. As indicated above, further lifting beyond the gagged position will cause the drag bar to be more nearly horizontal.

In the normal operating position, the mower and drag bar are free to oscillate in the transverse direction parallel to the hitch frame to the extent permitted by the leaf spring 32, the pivots at 36, 41, and 45 permitting this movement. Should the mower encounter a fixed obstruction such as a tree stump, sufficient load, in excess of about 400 pounds at the outer end of a 7 foot cutterbar, will be generated to overcome the detent spring 420 in the pull bar assembly 40 and enable the pull bar 40 to extend thus causing the entire drag bar assembly 30 to pivot backwards about the pivot point 36. The extension of the pull bar 40 takes place between the connection of the gag link 54 thereto and the lever arm 48 preventing adverse loading of the float spring 49 and lift chain 50.

Thus, it is apparent that there has been provided in accordance with the invention a cutterbar control system that fully satisfies the objects, aims, and advantages set forth above. While the invention has been described in conjunction with a specific embodiment thereof, it is evident that many alternatives, modifications, and variations will be apparent to those skilled in the art in the light of the foregoing description. For example, the float spring 49 and lifting chain 50 could be connected directly to the bail 20 rather than through the rocker lever 51 as described. This would reduce the distance that the cutterbar is lifted for the same change in the position of the bail 20. Accordingly, it is intended to embrace all such alternatives, modifications, and variations as fall within the spirit and broad scope of the appended claims.

What is claimed is:

1. A mower adapted for attachment at the rear of a tractor comprising:
   a frame adapted for attachment to a vertically movable tractor hitch;
   a drag bar pivotally mounted through means at one end to said frame for rotation about a vertical axis;
   a cutterbar pivotally attached at the other end of said drag bar for rotation thereabout between an operative position and a gagged position;
   a generally fore-and-aft extending pull bar having a forward end attached to said frame by first means permitting rotation of said pull bar about an axis generally longitudinal of said pull bar and having a rearward end attached to an intermediate portion of said drag bar by second means permitting rotation of said pull bar about said generally longitudinal axis;
   a float spring interconnecting said pull bar and said frame and disposed to exert a torque on said pull bar about said generally longitudinal axis in a first direction upon in said operative position;
   a lifting member connected to said pull bar and disposed to rotate said pull bar about said generally longitudinal axis in said first direction to said gagged position upon being loaded; and
   gag link means for pivoting said cutterbar about said drag bar having a first end connected to said cutterbar and a second end pivotally attached to said pull bar at a point removed from said axis of rotation thereof and disposed to rotate said pull bar in a direction opposite said first direction due to the weight of said cutterbar.

2. The invention in accordance with claim 1 and said rearward end of said pull bar being extendible in response to an overload condition on said cutterbar, said gag link means being connected to the extendible portion of said pull bar.

3. The invention in accordance with claim 2 and said pull bar further comprising an outer tube and a breakaway bar in telescopic engagement and nonrotatable relative to each other, said outer tube being attached to said frame and said breakaway bar being attached to said drag bar, and spring loaded detent means for maintaining said breakaway bar retracted within said outer tube during normal operation.

4. The invention in accordance with claim 1 and stop means operatively associated with said pull bar to limit the rotation thereof in said first direction thereby limiting rotation of said cutterbar to a fixed gag position relative to said drag bar.

5. The invention in accordance with claim 1 and said first and second means connecting said pull bar to said frame and said drag bar respectively permitting universal rotation in the horizontal and vertical planes.

6. The invention in accordance with claim 1 and a rocker lever pivotally mounted to the upper portion of said frame, said lift member being attached at one end of said lever and a tensile member attached to the opposite end of said lever, said tensile member being adapted for connection with said movable hitch.

7. The invention in accordance with claim 6 and said float spring being connected to said lever adjacent said lifting member.

8. A cutterbar control apparatus for a mower having a hitch frame adapted for vertical movement on a tractor, a drag bar, and a cutterbar pivotally mounted to said drag bar for vertical swinging movement in a transverse plane comprising a pull bar assembly having a first end connected for universal rotative movement to said hitch frame and a second end connected for universal rotative movement to said drag bar, said pull bar assembly being rotatable about an axis generally longitudinal thereof, a gag link having an end connected through means to said cutterbar to control the pivotal movement thereof about said drag bar, the opposite end of said gag link being attached to said pull bar assembly adjacent said second end, said gag link being disposed to exert a torque on said pull bar assembly due to the weight of said cutterbar, a spring interconnecting said pull bar assembly and said hitch frame and disposed to exert torque thereon in opposition to said torque exerted by said gag link, and a lifting member interconnecting said pull bar assembly and said hitch frame and disposed to rotate said pull bar assembly against said torque exerted by said gag link upon said hitch frame being raised.

9. The invention in accordance with claim 8 and said second end of said pull bar assembly being extendible relative to said first end in response to a predetermined excessive loading condition on said cutter bar, said gag link being connected to said second end of said pull bar.

10. The invention in accordance with claim 9 and said pull bar assembly comprising an outer tube, a breakaway bar slidably mounted in said outer tube, load ajustable detent means mounted in said outer tube and associated with said breakaway bar to prevent slidable movement therein in the absence of said excessive loading condition, and stop means mounted in said outer tube and associated with said breakaway bar to prevent separation thereof.

11. The invention in accordance with claim 9 and the body of said pull bar assembly being radially offset from the connection of said pull bar assembly and said drag bar.

12. The invention in accordance with claim 9 and said pull bar assembly having an oval eye member having a portion radially offset therefrom, said drag bar assembly having hook means engaging said radially offset portion of said oval eye, said gag link being connected to the other portion of said oval eye member.

13. The invention in accordance with claim 9 and stop means associated with said pull bar assembly and adapted to engage said hitch frame to limit the rotation of said pull bar assembly about said axis generally longitudinal thereof.

14. The invention in accordance with claim 9 and said hitch frame having hook means downwardly depending therefrom, said pull bar assembly having a U-shape eye member engaging said hook means at a point radially offset from the body of said pull bar assembly.

15. The invention in accordance with claim 13 and said U-shape eye member comprising a knee adapted to engage said hitch frame to limit rotation of said pull bar assembly about said axis generally longitudinal thereof.

16. In a mower of the type adapted for connection to a power operated vertically movable tractor hitch, said mower including a hitch frame connectible with said tractor hitch, a drag bar having its left side pivotally connected to said hitch frame, a cutterbar pivotally mounted to said drag bar for vertical movement in a transverse plane, a gag link operatively associated with said cutterbar for pivoting said cutterbar about said drag bar, lift means and float spring means acting on said cutterbar through said gag link, and draft link means connecting the right side of said hitch frame with said drag bar, the improvement wherein said draft link means comprises a pull bar rotatable about an axis generally longitudinal thereof, said gag link being pivotally connected to the rearward end of said pull bar remote from said axis, said float spring means and said lifting means being connected to said pull bar and disposed to rotate said pull bar against the loads imposed through said gag link by the weight of said cutterbar.

17. The invention in accordance with claim 16 and said pull bar being longitudinally extendible in response to overloads imposed on said cutterbar, the extensions of said pull bar taking place between said gag link connection with said pull bar and the connection of said float spring means and lifting means therewith.

* * * * *